United States Patent Office 3,175,993
Patented Mar. 30, 1965

3,175,993
POLYFUNCTIONAL SILOXANES CONTAINING TERMINAL ALKOXYL GROUPS
Donald R. Weyenberg, Midland, Mich., assignor to Dow Corning Corporation, Midland, Mich., a corporation of Michigan
No Drawing. Filed Oct. 16, 1961, Ser. No. 145,442
7 Claims. (Cl. 260—46.5)

This invention relates to organopolysiloxanes the molecules of which are endblocked with alkoxylated silcarbane groups. These polyfunctional polymers are capable of curing in air at room temperature especially with certain catalysts. These polymers are especially useful for room temperature vulcanizing elastomeric diorganopolysiloxanes.

The desirability of room temperature curing systems is now well established. Resinous systems are used primarily in coating applications such as in wood lacquers. Elastomeric systems are used both in coating applications and in calking applications. The first room temperature curing systems involved two or more stable components which, when mixed together, cured spontaneously to some desired solid material. Such systems could not be marketed as one component systems due to their spontaneous interaction resulting in curing the system to a solid, unworkable state.

Subsequently, it was found that certain fluid organopolysiloxanes containing silicon-bonded acyloxyl radicals as the only reactive groups were stable in the absence of moisture but cured in the presence of moisture to resinous or elastomeric solids depending on the organopolysiloxane structure and composition. With present commercial materials the curing of this one-component system is accompanied by the evolution of a carboxylic acid, generally acetic acid. This one-component system has been a great commercial success. However, there are some applications in which the presence of the carboxylic acid produced by this system is undesirable. The desirability of a commercially competitive product having universal application has made more urgent the perfection of other possible one-component room temperature curing organopolysiloxane systems.

The discovery of a new class of organopolysiloxane intermediates has made possible the preparation of a new one-component room temperature curing system employing a catalyst. The characteristics of the final cured product can be widely varied by variation in the composition and structure of the intermediate employed. Furthermore, the curing rate can be varied by the choice of catalyst and functional groups present in the system.

The primary object of this invention is to provide a new one-component room temperature curing organopolysiloxane system which is stable in the absence of moisture. Another object is to provide such a system which is free of acid. Another object is to provide a new class of organopolysiloxane intermediates suitable for use in the new system.

This invention relates to compositions of the average molecular formula

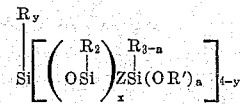

in which each R is free of aliphatic unsaturation and is of the group monovalent hydrocarbon, monovalent halohydrocarbon and monovalent cyanoalkyl radicals of 1 to 18 inclusive carbon atoms, Z is a divalent hydrocarbon radical free of aliphatic unsaturation of from 2 to 18 inclusive carbon atoms. R' is an alkyl radical or haloalkyl radical having no halogen alpha to the oxygen, both of less than 5 carbon atoms, $y$ has an average value from 0 to 2 inclusive, $x$ has a value of at least 3 and $a$ has an average value from 2 to 3 inclusive.

The term "average molecular formula" means that the compositions of this invention include mixtures of the various configurations shown above and that in those cases where $y$ is 0 or 1, the value of $x$ in the various branches of the molecules can be of different values. The term also includes molecules in which some of the terminal OR' groups have been hydrolyzed by the incidental presence of moisture during the preparation or storage of the compositions.

It can be seen that the characteristic feature of the above compositions is the presence of terminal silicon atoms having two or three alkoxy groups attached. This is the configuration which imparts the distinctive features described below to the compositions. It can also be seen that the molecules can be linear in structure having the configuration

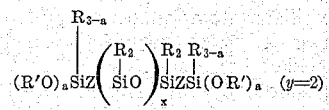

or they can be branched in structure

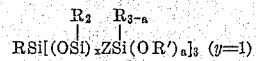

and

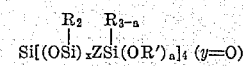

The compositions of this invention are benzene soluble curable materials which set to insoluble gels on exposure to moisture especially in the presence of a catalyst for the reaction of alkoxy groups with water and for the reaction of alkoxy groups with SiOH. However, the combination of catalysts and siloxane is stable in the absence of moisture. Therefore, they can be stored for prolonged periods of time. The term "moisture" as used herein includes both water and water vapor including atmospheric moisture.

In the compositions of this invention, each R can be any monovalent hydrocarbon radical, any halogenated monovalent hydrocarbon radical or any cyanoalkyl radical. More specifically, each R can be, for example, any alkyl radical such as the methyl, ethyl, isopropyl, tert-butyl, 2-ethylhexyl, dodecyl, 1-isobutyl-3,5-dimethylhexyl, octadecyl and myricyl radicals; any cycloalkyl radical such as the cyclopentyl and cyclohexyl radicals; any aryl radicals such as the phenyl, naphthyl and xenyl radicals; any aralkyl radical such as the benzyl, phenylethyl and xylyl radicals and any alkaryl radical such as the tolyl and dimethylphenyl radicals. These monovalent hydrocarbon radicals can be halogenated to give such radicals as the chloromethyl, 3,3,3-trifluoropropyl, 3,3,4,4,5,5,5-heptafluoropentyl, perchlorophenyl, 3,4-dibromocyclohexyl, α,α,α-trifluorotolyl, 2,4-dibromobenzyl and α,β,β-trifluoro-α-chlorocyclobutyl radicals, all of which are operative.

In addition each R can be any cyanoalkyl radical such as the beta-cyanoethyl, gamma-cyanopropyl, omega-cyanobutyl, beta-cyanopropyl, gamma-cyanobutyl and omega-cyanooctadecyl. When a compound of this invention contains cyanoalkyl radicals, it is preferred that such radicals be attached to at least one mol percent of the silicon atoms in the compound.

In the functional units in the compounds of this invention, each R' in the functional (R'O) groups can be any alkyl radical of less than about 5 carbon atoms, such as the methyl, ethyl, n-propyl and isopropyl radicals or any haloalkyl radical such as β-chloroethyl, β-chloropropyl, 2,2,2-trifluoroethyl, gamma-bromopropyl, deltaiodobutyl and 3,3,3,2,2-pentafluoropropyl. Preferably R' is a methyl radical.

In the functional units in the compounds of this invention each Z can be any divalent hydrocarbon radical free of aliphatic unsaturation forming a silcarbane linkage. Examples of suitable divalent hydrocarbon radicals include

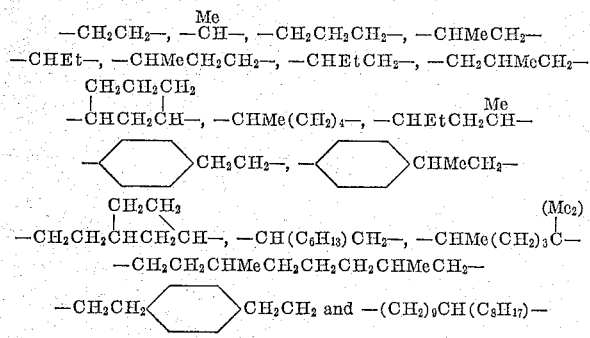

the symbols Me and Et represent the methyl and ethyl radicals respectively. Usually Z has such a configuration that the silicon atoms connected by Z are separated by at least two carbon atoms and preferably Z contains no more than 18 carbon atoms.

The compositions of this invention are best prepared by reacting a siloxane of the formula

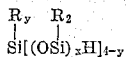

with silanes of the formula

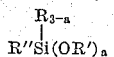

in which R'' is a monovalent hydrocarbon radical having an aliphatic or cycloaliphatic C=C group in the presence of a Pt catalyst. The reaction proceeds at temperatures of from 30 to 150° C. with the addition of the silane to the SiH group to give the $$-ZSi(OR')_a \atop R_{3-a}$$

group. Suitable catalysts for carrying out the addition are chloroplatinic acid, Pt on charcoal or Pt on alumina.

Alternatively one can react siloxanes of the formula

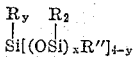

with silanes of the formula

under the conditions shown above.

The intermediate siloxanes employed to make the compositions of this invention are made by conventional cohydrolysis of chlorosilanes of the formula $R_2SiCl_2$ and $R_2HSiCl$ or $R_2R''SiCl$. When $y$ is 0 or 1, then $SiCl_4$ and/or $RSiCl_3$ are included. The value of $x$ is controlled by the mol ratio of the various silanes.

The unsaturated silanes employed herein are best prepared by the classical Grignard reaction between the magnesium derivative of an unsaturated halohydrocarbon and a chloro- or alkoxysilane of the formula $RSiX_3$ or $SiX_4$. Suitable unsaturated hydrocarbon halides are

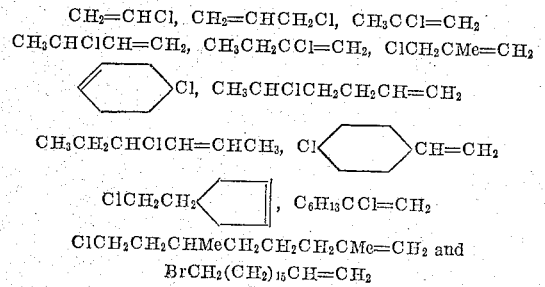

The unsaturated silanes in which R' is a haloalkyl radical are prepared by reacting the halosilanes of the formula $R''R_{3-a}SiX_a$ with halogenated alcohols or with 1,2 alkylene oxides. The reactions are

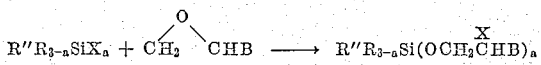

B can be either H or alkyl.

The compositions of this invention are useful as coating compositions, sealants, impregnating compounds and for electrical insulation. In many of these uses it is desirable to employ a filler in order to extend the composition or to impart specific properties thereto. Suitable fillers include organic compounds such as phthalocyanine, copper phthalocyanine and organic fibers and inorganic fillers such as metal oxides such as $TiO_2$, zinc oxide, alumina, ferric oxide and magnesium oxide; siliceous materials such as aluminum silicate, clays and zirconium silicate; silicas such as diatomaceous earth, sand, glass, powdered quartz, fume silica, silica aerogel and precipitated silica, powdered metals such as aluminum and zinc; and carbon such as graphite and carbon black.

As stated above, any catalyst which promotes the reaction of an alkoxysiloxane with water or the reaction of an alkoxy group with a silanol group can be employed to cure the compositions of this invention in the presence of moisture. Preferably the catalyst should be compatible with the siloxane, although solvents can be employed, if desired, to increase the compatibility of the catalyst with the siloxane. Specific catalysts which are operative include organometallic compounds such as metal salts of monocarboxylic acids such as lead 2-ethylhexoate, dibutyltin diacetate, dibutyltin 2-ethylhexoate, dibutyltin dilaurate, butyltin tri-2-ethylhexoate, iron 2-ethylhexoate, cobalt 2-ethylhexoate, magnesium 2-ethylhexoate, zinc 2-ethylhexoate, stannous octoate, tin naphthenate, zirconium octoate, antimony octoate, bismuth naphthenate, tin oleate, tin butyrate, zinc naphthenate, zinc stearate and titanium naphthenate; organotitanium esters and partial hydrolyzates thereof such as tetrabutyltitanate, tetra - 2 - ethylhexyltitanate, tetraphenyltitanate, tetraoctadecyltitanate, triethanolaminetitanate, octyleneglycoltitanate and bis-acetylacetonyl diisopropyltitanate; amines such as hexylamine, dodecylamine, di-n-hexylamine; amine salts such as hexylamine acetate, dodecylamine phosphate and hexylamine octoate; quaternary amine salts such as benzyltrimethylammoniumacetate, hydroxyethyltrimethylammonium - 2 - ethylhexoate and tetraethylammoniumbutyrate; carboxylic acids such as acetic acid and formic acid and inorganic acids such as HCl.

For the purpose of this invention the amount of catalyst is not critical but it is normally present in amount of from .1 to 2 percent by weight, based on the weight of the siloxane.

The following examples are illustrative only and should not be construed as limiting the invention. The term Me is used herein as an abbreviation for the methyl radical.

EXAMPLE 1

A mixture of 277 grams of (A) a dimethylhydrogensiloxy-endblocked dimethylpolysiloxane containing 0.120 percent by weight silicon-bonded hydrogen and 68 grams of vinyltrimethoxysilane was prepared. Approximately 5 parts by weight per million of platinum based on the weight of the total reactants were added to about ¼ of the mixture as a soluble platinum compound, e.g. chloroplatinic acid, and the system was heated to 125° to 130° C. The remainder of the reactant mixture was then added. The system was heated one hour at 145° C. and stripped to 150° C. at 3 to 4 mm. Hg yielding a straw colored fluid of the general formula $(CH_3O)_3SiCH_2CH_2Si(CH_3)_2O[Si(CH_3)_2O]_n$
$Si(CH_3)_2CH_2CH_2Si(OCH_3)_3$ in which $n$ has an average value of about 21.

EXAMPLE 2

A mixture of 265.5 grams of (A) in Example 1, 53 grams of vinylmethyldimethoxysilane and approximately 5 parts by weight per million of platinum based on the total reactants added as a solution of a soluble platinum compound, e.g., chloroplatinic acid, in ethanol was refluxed for about two hours. Another 15 grams of vinylmethyldimethoxysilane with another portion of platinum catalyst were then added to the reaction mixture. The resulting mixture was heated for 2 hours at 170° to 180° C. and stripped to 150° C. at 2 mm. Hg, yielding a clear straw colored fluid of the general formula $(CH_3O)_2Si(CH_3)CH_2CH_2Si(CH_3)_2O[Si(CH_3)_2O]_n$
$Si(CH_3)_2CH_2CH_2Si(CH_3)(OCH_3)_2$ in which $n$ has an average value of about 21. 20 grams of this product were mixed with about 0.25 gram of stannous octoate. A portion of this sample was placed in an open dish. This portion had a tack-free solid surface film in 40 minutes and was completely cured in 72 hours. The remainder of the mixture stored in a capped bottle showed no change.

EXAMPLE 3

Two mixtures were prepared. The first was made up of 10 grams of a siloxane like that produced in Example 1 and about 0.1 gram of tetraisopropyltitanate. The second mixture was made up of 10 grams of the siloxane fluid produced in Example 2 and about 0.1 gram of tetraisopropyltitanate.

Both mixtures cured to tack-free solid films in less than 24 hours in air at room temperature. There was no change during this time in portions of these mixtures kept in closed bottles.

EXAMPLE 4

About 0.1 gram of tetrakis-methylcellosolve-titanate was added to 8 grams of the siloxane fluid produced in Example 2. A portion of this mixture cured in thin section to a tack-free film in 48 hours in air at room temperature.

EXAMPLE 5

The following alkoxylated siloxanes are obtained when the following siloxanes are reacted with the following silanes in the presence of the catalysts of Example 1.

*Table 1*

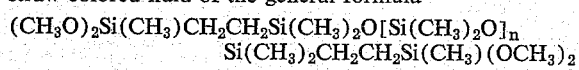

When each of the above alkoxysiloxanes is mixed with stannous octoate in amount of 1 percent by weight based on the weight of the siloxane, the resulting product is stable in the absence of moisture but will cure on exposure to the atmosphere.

EXAMPLE 6

When the following halosilanes are reacted with the following alkylene oxides, the following silanes are obtained. The reaction is carried out at room temperature by adding the oxide to the chlorosilane with stirring.

| Halosilane | Alkylene oxide | Silane |
|---|---|---|
| $C_2H_3SiCl_3$ | Ethylene oxide | $C_2H_3Si(OCH_2CH_2Cl)_3$ |
| $CH_2=CHCH_2SiBr_3$ | 1,2-propylene oxide | $CH_2=CHCH_2Si(OCH_2\overset{Br}{C}HCH_3)_3$ |
| $C_2H_3\overset{Me}{S}iCl_2$ | 1,2-butylene oxide | $C_2H_3Si(OCH_2\overset{Me}{C}H\overset{Cl}{C}_2H_5)_2$ |

When the following alcohols are reacted with the following chlorosilanes, the following silanes are obtained.

| Chlorosilane | Alcohol | Silane |
|---|---|---|
| $C_2H_3SiCl_3$ | $CF_3CH_2OH$ | $C_2H_3Si(OCH_2CF_3)_3$ |
| $C_2H_3\overset{C_6H_5}{S}iCl_2$ | $CH_2ClCH_2CH_2OH$ | $C_2H_3\overset{C_6H_5}{S}i(OCH_2CH_2CH_2Cl)_2$ |
| $C_2H_3SiCl_3$ | $CH_2Cl(CH_2)_3OH$ | $C_2H_3Si[O(CH_2)_3CH_2Cl]_3$ |
| $C_2H_3SiCl_3$ | $ClCH_2\overset{CH_3}{C}HOH$ | $C_2H_3Si(O\overset{CH_2-Cl}{C}HCH_3)_3$ |

When each of the above silanes are reacted with the siloxane $$H\overset{Me_2}{\underset{|}{Si}}(O\overset{Me_2}{\underset{|}{Si}})_{100}H$$

in accordance with the procedure of Example 1, the following siloxanes are obtained.

$$(ClCH_2CH_2O)_3Si(CH_2)_2\overset{Me_2}{\underset{|}{Si}}[O\overset{Me_2}{\underset{|}{Si}}]_{100}(CH_2)_2Si(OCH_2CH_2Cl)_3$$

$$(CH_3\overset{Br}{\underset{|}{C}}HCH_2O)_3Si(CH_2)_3\overset{Me_2}{\underset{|}{Si}}[O\overset{Me_2}{\underset{|}{Si}}]_{100}(CH_2)_3Si(OCH_2\overset{Br}{\underset{|}{C}}HCH_3)_3$$

$$(C_2H_5\overset{Cl}{\underset{|}{C}}HCH_2O)_2\overset{Me}{\underset{|}{Si}}(CH_2)_2\overset{Me_2}{\underset{|}{Si}}[O\overset{Me_2}{\underset{|}{Si}}]_{100}(CH_2)_2\overset{Me}{\underset{|}{Si}}(OCH_2\overset{Cl}{\underset{|}{C}}HC_2H_5)_2$$

$$(CF_3CH_2O)_3Si(CH_2)_2\overset{Me_2}{\underset{|}{Si}}[O\overset{Me_2}{\underset{|}{Si}}]_{100}(CH_2)_2Si(OCH_2CF_3)_3$$

$$(ClCH_2CH_2CH_2O)_2\overset{C_6H_5}{\underset{|}{Si}}(CH_2)_2\overset{Me_2}{\underset{|}{Si}}[O\overset{Me_2}{\underset{|}{Si}}]_{100}(CH_2)_2\overset{C_6H_5}{\underset{|}{Si}}(OCH_2CH_2CH_2Cl)_2$$

$$[ClCH_2(CH_2)_3O]_3Si(CH_2)_2\overset{Me_2}{\underset{|}{Si}}[O\overset{Me_2}{\underset{|}{Si}}]_{100}(CH_2)_2Si[O(CH_2)_3CH_2Cl]_3$$

$$[CH_3\overset{CH_2-Cl}{\underset{|}{C}}H-O]_3Si(CH_2)_2\overset{Me_2}{\underset{|}{Si}}[O\overset{Me_2}{\underset{|}{Si}}]_{100}(CH_2)_2Si[O\overset{CH_2-Cl}{\underset{|}{C}}H-CH_3]_3$$

When each of these siloxanes is mixed with .3 percent by weight dibutyl tin dilaurate in the absence of moisture the composition is stable but they will cure to rubbery materials on exposure to moisture.

That which is claimed is:

1. A composition of matter consisting essentially of molecules of the average formula $$\overset{R_y}{\underset{|}{Si}}[(O\overset{R_2}{\underset{|}{Si}})_xZ\overset{R_{3-a}}{\underset{|}{Si}}(OR')_a]_{4-y}$$

in which each R is free of aliphatic unsaturation and is selected from the group consisting of monovalent hydrocarbon radicals, monovalent halohydrocarbon radicals and monovalent cyanoalkyl radicals, all of 1 to 18 inclusive carbon atoms, Z is a divalent hydrocarbon radical free of aliphatic unsaturation of from 2 to 18 inclusive carbon atoms, R' is selected from the group consisting of haloalkyl radicals having no halogen alpha to the oxygen and alkyl radicals, both of less than 5 carbon atoms, y has an average value from 0 to 2 inclusive, x has a value of at least 3 and a has an average value from 2 to 3 inclusive.

2. A composition in accordance with claim 1 in which R and R' are both methyl and in which Z is an ethylene group.

3. A curable benzene soluble composition of matter which is stable in the absence of moisture but cures at room temperature on exposure to moisture consisting essentially of (1) a siloxane of the average molecular formula $$\overset{R_y}{\underset{|}{Si}}[(O\overset{R_2}{\underset{|}{Si}})_xZ\overset{R_{3-a}}{\underset{|}{Si}}(OR')_a]_{4-y}$$

in which each R is free of aliphatic unsaturation and is selected from the group consisting of monovalent hydrocarbon radicals, monovalent halohydrocarbon radicals and monovalent cyanoalkyl radicals, all of from 1 to 18 inclusive carbon atoms, Z is a divalent hydrocarbon radical free of aliphatic unsaturation, all of from 2 to 18 inclusive carbon atoms, R' is selected from the group consisting of haloalkyl radicals having no halogen alpha to the oxygen and alkyl radicals, both of less than 5 carbon atoms, y has an average value of from 0 to 2 inclusive, x has a value of at least 3 and a has an average value of from 2 to 3 inclusive and (2) a catalyst capable of curing said siloxane in the presence of moisture.

4. A composition in accordance with claim 3 which also contains a filler.

5. A composition in accordance with claim 3 in which both R and R' are methyl radicals.

6. The method comprising exposing the composition of claim 3 to moisture whereby said composition is cured.

7. The method comprising exposing the composition of claim 4 to moisture whereby said composition is cured.

References Cited by the Examiner

UNITED STATES PATENTS

| | | | |
|---|---|---|---|
| 2,562,000 | 7/51 | Sveda | 260—46.5 |
| 2,590,937 | 4/52 | Clark | 260—46.5 |
| 3,122,522 | 2/64 | Brown et al. | 260—448.8 |

FOREIGN PATENTS

| | | |
|---|---|---|
| 508,113 | 12/54 | Canada. |
| 865,658 | 7/49 | Germany. |

OTHER REFERENCES

Eaborn: Organosilicon Compounds (N.Y.: Academic Press, Inc., 1960), page 469.

"Titanium and Latex," Paint, Oil and Chemical Review, March 22, 1956, pages 10–12.

MURRAY TILLMAN, *Primary Examiner*.

J. R. LIBERMAN, WILLIAM H. SHORT, *Examiners*.